(12) United States Patent
Ortner et al.

(10) Patent No.: US 9,884,602 B2
(45) Date of Patent: Feb. 6, 2018

(54) AIRBAG CONTROL UNIT, POWER NETWORK, AND METHOD FOR CONTROLLING A VOLTAGE NETWORK IN A MOTOR VEHICLE

(71) Applicant: VOLKSWAGEN AG, Wolfsburg (DE)

(72) Inventors: Andreas Ortner, Wahrenholz (DE); Andreas Deyda, Erkerode (DE); Adam Moik, Peine (DE); Dietmar Wolf, Osloβ (DE)

(73) Assignee: VOLKSWAGEN AG, Wolfsburg (DE)

( * ) Notice: Subject to any disclaimer, the term of this patent is extended or adjusted under 35 U.S.C. 154(b) by 165 days.

(21) Appl. No.: 15/014,482

(22) Filed: Feb. 3, 2016

(65) Prior Publication Data
US 2016/0221523 A1    Aug. 4, 2016

(30) Foreign Application Priority Data

Feb. 3, 2015    (DE) .................. 10 2015 201 814

(51) Int. Cl.
*B60R 22/00*    (2006.01)
*E05F 15/00*    (2015.01)
(Continued)

(52) U.S. Cl.
CPC ............ *B60R 21/01* (2013.01); *B60L 3/0007* (2013.01); *B60L 3/0046* (2013.01); *B60L 3/04* (2013.01); *B60R 16/03* (2013.01); *B60R 21/0173* (2013.01); *B60K 2028/006* (2013.01); *B60R 2021/01075* (2013.01); *B60R 2021/01136* (2013.01); *B60R 2021/01163* (2013.01); *B60R 2021/01252* (2013.01); *B60R 2021/01286* (2013.01)

(58) Field of Classification Search
None
See application file for complete search history.

(56) References Cited

U.S. PATENT DOCUMENTS

2014/0309827 A1    10/2014 Kanzaki et al.

FOREIGN PATENT DOCUMENTS

| CN | 1469823 A | 1/2004 |
|---|---|---|
| CN | 102687321 A | 9/2012 |

(Continued)

OTHER PUBLICATIONS

Search Report for European Patent Application No. 16151241.3; dated Jun. 29, 2016.

(Continued)

*Primary Examiner* — Bhavesh V Amin
(74) *Attorney, Agent, or Firm* — Barnes & Thornburg LLP (57) ABSTRACT

An airbag control device, wherein the airbag control device generates at least one actuation signal for an actuation time as a function of at least one sensor signal, wherein the airbag control device can maintain the at least one actuation signal for a holding time, wherein the airbag control device has at least one non-volatile memory in which the generation of the at least one actuation signal can be stored, wherein the airbag control device, when the at least one actuation signal is generated, stores a status signal in the at least one non-volatile memory or in a further non-volatile memory, wherein the status signal is deleted again if the at least one actuation signal was generated for longer than a storage time. Also disclosed is a voltage network in a motor vehicle and to a method for actuating a voltage network.

6 Claims, 5 Drawing Sheets

(51) Int. Cl.
*B60R 21/01* (2006.01)
*B60L 3/04* (2006.01)
*B60R 16/03* (2006.01)
*B60R 21/017* (2006.01)
*B60L 3/00* (2006.01)
*B60K 28/00* (2006.01)

(56) References Cited

FOREIGN PATENT DOCUMENTS

| | | |
|---|---|---|
| DE | 10203408 A1 | 8/2002 |
| DE | 10315531 A1 | 11/2004 |
| DE | 102009051293 A1 | 5/2011 |
| DE | 102010045581 A1 | 3/2012 |
| DE | 102012007119 A1 | 10/2013 |
| DE | 102012018338 A1 | 3/2014 |
| DE | 102012221319 A1 | 5/2014 |
| JP | 2006246623 A | 9/2006 |
| JP | 2011217544 A | 10/2011 |
| KR | 101257923 B1 | 4/2013 |
| WO | 0032445 A1 | 6/2000 |

OTHER PUBLICATIONS

Search Report for German Patent Application No. 10 2015 201 814.8; dated Jul. 27, 2015.
Office Action for Chinese Patent Application No. 201610075339.7; dated Oct. 10, 2017.

AIRBAG CONTROL UNIT, POWER NETWORK, AND METHOD FOR CONTROLLING A VOLTAGE NETWORK IN A MOTOR VEHICLE

PRIORITY CLAIM

This patent application claims priority to German Patent Application No. 10 2015 201 814.8, filed 3 Feb. 2015, the disclosure of which is incorporated herein by reference in its entirety.

SUMMARY

Illustrative embodiments relate to an airbag control device, a voltage network in a motor vehicle, and to a method for actuating a voltage network.

Illustrative embodiments provide an airbag control device and a voltage network by which re-activation of the high-voltage battery is more reliably prevented when an actuation signal of the airbag control device has occurred.

BRIEF DESCRIPTION OF THE DRAWINGS

The disclosed embodiments will be explained in more detail with reference to the drawings, in which.

DETAILED DESCRIPTION OF THE DISCLOSED EMBODIMENTS

The airbag control device generates at least one actuation signal for an actuation time as a function of at least one sensor signal, wherein the airbag control device is also embodied such that, in the event of failure of a voltage supply, the airbag control device can maintain the at least one actuation signal for a holding time, wherein the airbag control device is embodied with at least one non-volatile memory in which the generation of the at least one actuation signal can be stored.

Furthermore, the airbag control device is embodied such that, when the at least one actuation signal is generated, a status signal is stored in the at least one non-volatile memory or in a further non-volatile memory, which status signal is deleted again if the at least one actuation signal was generated for longer than a storage time, wherein the storage time is longer than the holding time and less than/equal to the actuation time, wherein when the airbag control device is powered up an actuation signal is transmitted again for a second actuation time if the status signal is still set. In this context, the second actuation time is at least as long as the storage time. This ensures that even in the case of a relatively long lasting voltage dip, wherein another control device (for example the high-voltage control device) has not yet been able to store the "actuation signal" event, the actuation signal is transmitted at least once more when powering up occurs again. As a result of the renewed transmission, re-activation of the high-voltage battery is prevented. The renewed transmission as a result of the failure of the time ta to be reached can be limited to a predefined number of firing changes (terminal 15 on/off).

In an alternative disclosed embodiment, the airbag control device is embodied such that when the airbag control device is powered up, an actuation signal is generated for an actuation time if the generation of the at least one actuation signal is stored in the at least one non-volatile memory. This is also a way of preventing re-activation of the high-voltage battery. In this case, the status signal is dispensed with, but, under certain circumstances, the actuation signal is also transmitted again unnecessarily, because the high-voltage control device had already stored the event.

In a further disclosed embodiment, the airbag control device is embodied such that, when the airbag control device is powered up at the request of a further control device, an actuation signal is generated for a second actuation time if the generation of the at least one actuation signal is stored in the at least one non-volatile memory. In this disclosed embodiment, the actuation signal is transmitted again only when necessary, but this disclosed embodiment has an increased communication requirement.

In a further disclosed embodiment, the second actuation time is selected to be equal to the actuation time. This reduces the control expenditure in the airbag control device and is long enough in any case to ensure that the other control device can reliably store the event.

The voltage network in a motor vehicle comprises a high-voltage power system having at least one high-voltage battery which can be disconnected from the high-voltage power system by means of at least one contactor, and a low-voltage on-board power system with an on-board power system battery, an airbag control device and a high-voltage control device. In this context, contactors can be provided to disconnect the high-voltage battery from all poles. The high-voltage control device is embodied in such a way that it actuates the at least one contactor at least as a function of an actuation signal of the airbag control device, wherein the high-voltage control device is embodied with a non-volatile memory in which the occurrence of an actuation signal of the airbag control device can be stored. The high-voltage control device is embodied here in such a way that when powering up occurs the at least one contactor is closed only if there is no current entry of an actuation signal present in the non-volatile memory. In addition, the airbag control device is embodied as described above, with the result that the contactor is also closed only if an actuation signal was not previously generated, which could only not be stored by the high-voltage control device or some other control device. With respect to the refinement of the airbag control device, reference is made here to the entire contents of the preceding disclosed embodiments.

In a further disclosed embodiment, the airbag control device is embodied with an energy store or with an auxiliary voltage source or the airbag control device is assigned an auxiliary voltage source, by means of which the voltage supply of the airbag control device is maintained for the holding time in the event of a voltage dip.

With respect to the refinements of the disclosed embodiments with respect to the method, reference is also made to the entire contents of the preceding disclosed embodiments.

Figure 1:
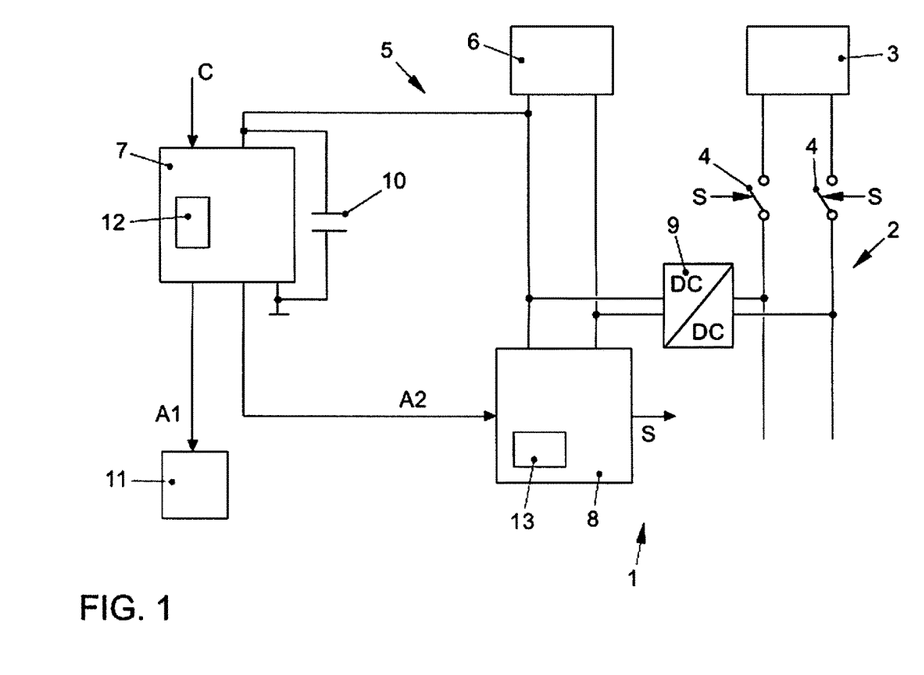
FIG. 1 shows a schematic block circuit diagram of a voltage network in a motor vehicle.

The voltage network 1 which is illustrated in FIG. 1 comprises a high-voltage power system 2 with a high-voltage battery 3 which can be disconnected from the high-voltage power system 2 by means of two contactors 4. Furthermore, the voltage network 1 comprises a low-voltage on-board power system 5 with an on-board power system battery 6, an airbag control device 7 and a high-voltage control device 8. A DC/DC converter 9, by means of which the high-voltage battery 3 can charge the on-board power system battery 6, is arranged between the high-voltage power system 2 and the low-voltage on-board power system 5. Furthermore, the low-voltage on-board power system 5 comprises an auxiliary voltage source 10 which is assigned to the airbag control device 7. Sensor data on the basis of which the airbag control device 7 decides whether an airbag 11 is to be fired or not are fed to the airbag control device 7. The sensor data are, for example, acceleration values and seat occupations. However, further sensor data of, for example, cameras can also be used. These sensor data are described below in a combined fashion as the crash signal C. The airbag control device 7 has a non-volatile memory 12 which is embodied, for example, as an EEPROM. The high-voltage control device 8 also has a non-volatile memory 13, which is also embodied, for example, as an EEPROM. The airbag control device 7 generates an actuation signal A1 for the at least one airbag 11, and an actuation signal A2 for the high-voltage control device 8, as a function of the crash signal C.

In this context, the auxiliary voltage source 10 is dimensioned in such a way that in the event of a voltage dip in the low-voltage on-board power system 5 the actuation signals A1, A2 are still generated at least for a holding time tH, with the result that the airbag 11 is reliably fired. In this case the generation of the actuation signals A1, A2 is stored in the non-volatile memory 12. The high-voltage control device 8 generates control signals S as a function of which the contactors 4 are actuated. If the high-voltage control device 8 then receives an actuation signal A2, the contactors 4 are opened and the occurrence of the actuation signal A2 is stored in the non-volatile memory 13. However, this storage process requires a certain amount of time. This will now be explained below in more detail on the basis of FIGS. 2a-2d.

Figure 2A:
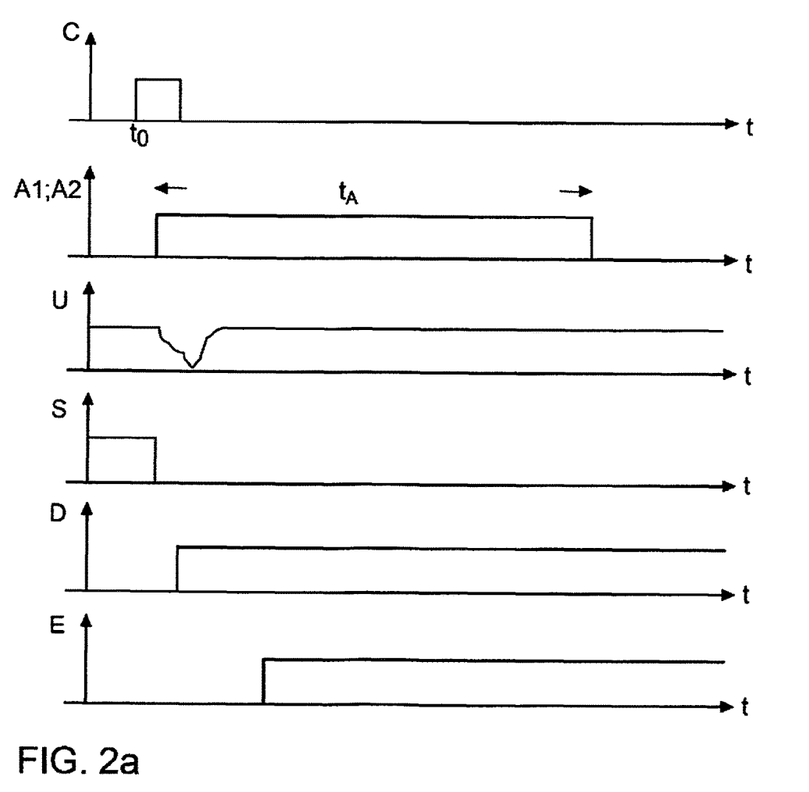
FIG. 2a shows signal profiles in the case of a voltage dip which is shorter than the holding time without further measures.
Figure 2B:
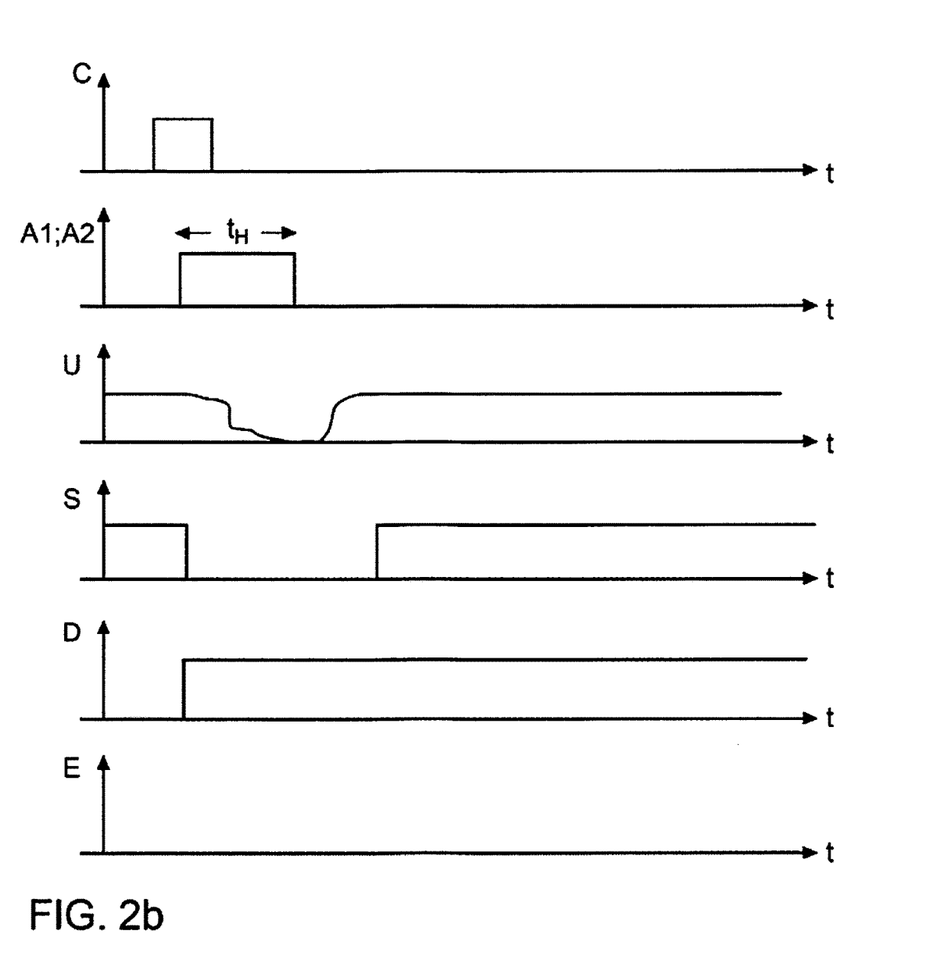
FIG. 2b shows signal profiles in the case of a voltage dip which is longer than the holding time without further measures.

In this context, various signal profiles without further measures are illustrated in FIGS. 2a and 2b. At a time t0, a crash signal C occurs, in response to which the airbag control signal 7 generates the actuation signals A1, A2 for an actuation time tA. The actuation time tA is, for example, 10 s. If an interruption in the voltage supply U which is shorter than the holding time tH occurs here, this does not have any effects on the generation of the actuation signals A1, A2. Owing to the actuation signal A2, the high-voltage control device 8 opens the contactors 4 (S=0). After a short time delay, the occurrence of the crash signal C or the generation of the actuation signals A1, A2 in the airbag control device 7 is stored as a signal D in the non-volatile memory 12. The interruption of the voltage supply U does not constitute a problem here, since the auxiliary voltage source 10 takes over supplying the voltage for the airbag control device 7 for the holding time tH. The storage process can initially not be carried out at the high-voltage control device 8 for as long as the voltage supply U is interrupted. However, if the high-voltage control device 8 is then powered up again, because the voltage supply U is available again, the actuation signal A2 is still present. The contactors 4 remain open and the high-voltage control device 8 stores the presence of the actuation signal A2 as a signal E in the non-volatile memory 13. Re-activation of the contactors 4 without corresponding monitoring by service personnel is therefore effectively prevented.

In contrast, in the example according to FIG. 2b, the voltage dip of the voltage supply U is longer than the holding time tH, with the result that after the holding time tH the voltage supply of the airbag control device 7 also collapses. If the airbag control device 7 then powers up again, the latter no longer transmits an actuation signal since the airbag 11 has triggered. However, the high-voltage control device 8 has not been able to store any information E, with the result that the contactors 4 would be closed again (S=1).

Figure 2C:
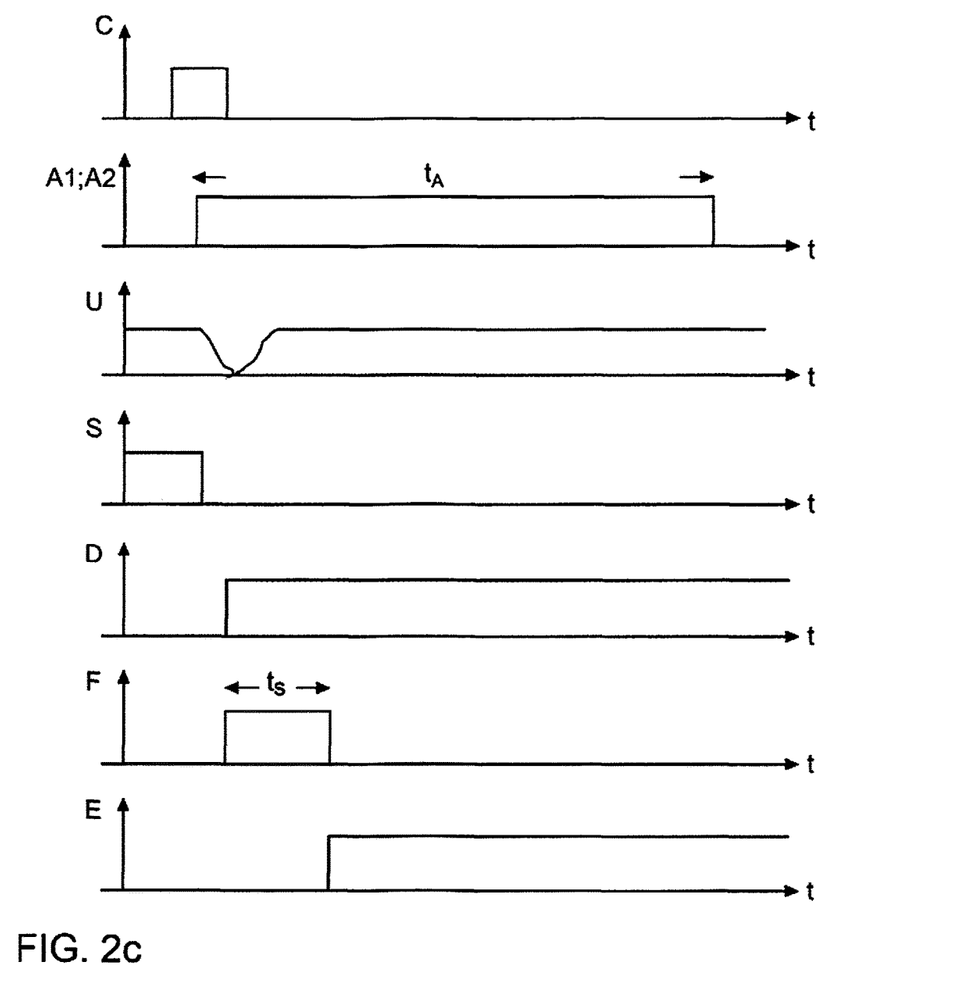
FIG. 2c shows signal profiles in the case of a voltage dip which is shorter than the holding time with a status signal.

To solve this problem, a status signal F is additionally stored in the non-volatile memory 12 (see FIG. 2c). This status signal F is set or stored together with the signal D and reset again after a storage time tS. The storage time tS is longer than the holding time tH here. If the actuation signal A2 is then present for the storage time tS, it is possible to conclude therefrom that there can only have been a voltage dip which was shorter than the holding time tH, with the result that the high-voltage control device 8 has sufficient time to store the signal E and prevent re-activation of the contactors 4.

Figure 2D:
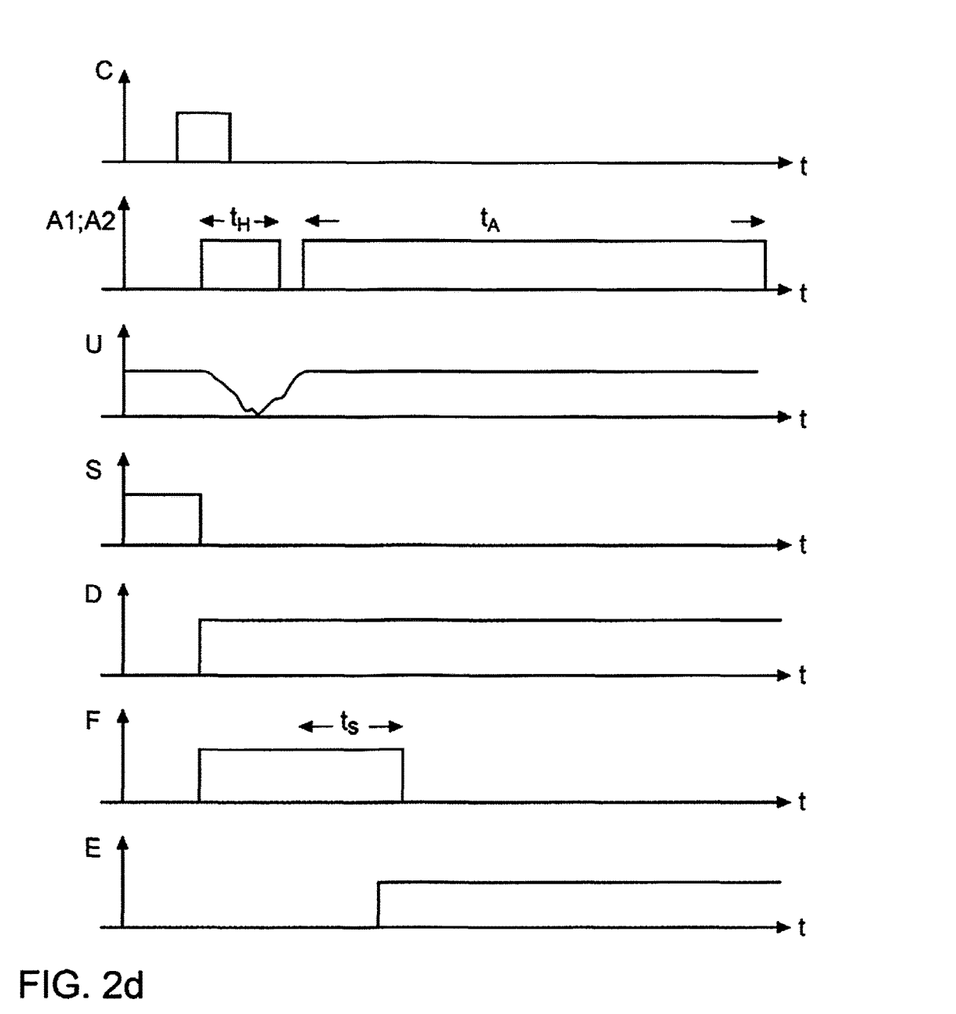
FIG. 2d shows signal profiles in the case of a voltage dip which is longer than the holding time with a status signal.

FIG. 2d now illustrates the situation in which the voltage dip of the voltage supply U is longer than the holding time tH. The actuation signal A2 is then also present only for the holding time tH, that is to say for shorter than the storage time tS. Correspondingly, the status signal F is not reset. If the voltage supply U is then present again, the airbag control device 7 powers up again and detects that the status signal F is still set. In reaction, the actuation signal A2 is transmitted again for the actuation time tA. If the actuation signal A2 is then present for longer than the storage time tS, the status signal F can be reset, since it is then ensured that the high-voltage control device 8 has reliably stored the signal E. The contactors 4 remain open.

Illustrative embodiments relate to an airbag control device, a voltage network in a motor vehicle, and to a method for actuating a voltage network.

DE 10 2009 051 293 A1 discloses a circuit arrangement of the generic type for disconnecting a high-voltage source from an electrical power supply system in a motor vehicle, wherein the power supply system has a first voltage supply system with a high-voltage battery and a second voltage supply system with a low-voltage on-board power supply battery. The circuit arrangement has a switching device for disconnecting the high-voltage battery from the first voltage supply system, wherein the switching device can be switched by means of a control current from the second voltage supply system in such a way that when the control current is fed in the switching device connects the high-voltage battery to the first voltage supply system, and when the control current is interrupted the switching device disconnects the high-voltage battery from the first voltage supply system. Furthermore, the circuit arrangement has an airbag control device by means of which a request situation for triggering a safety function can be detected. Furthermore, the circuit arrangement has a high-voltage control device which is connected to the airbag control device via at least one data bus, wherein the high-voltage control device controls the control current for the switching device. When the request situation is detected during operation of the circuit arrangement, the airbag control device transmits a predetermined control instruction to the at least one data bus, and in reaction to the predetermined control instruction the high-voltage control device interrupts the feeding of the control current to the switching device.

Airbag control devices usually have a non-volatile memory in which the triggering is stored. To ensure the firing of an airbag even in the event of voltage dips, it is also known to maintain the triggering signal at least for a holding time by means of an auxiliary voltage source until the airbags have reliably fired.

DE 103 15 531 A1 discloses a memory cell circuit which produces a non-volatile memory cell to implement a reliable memory. In this context, the memory cell circuit has a first and a second control input, wherein the first and the second control inputs are disconnected from one another. This disconnection permits a different control voltage at the first control input and at the second control input. These different control voltages reduce the voltage loading, with the result that a longer or maximum operating service life can be achieved and consequently a more reliable non-volatile memory cell can be obtained.

WO 00/32445 discloses a control device for a motor vehicle vehicle-occupant protection system which can be triggered in multiple stages and in which in addition to a crash sensor a further, redundant crash sensor is connected as what is referred to as a safing sensor, wherein the safing sensor is connected in series with the ignition stage of the vehicle-occupant protection system. This avoids incorrect triggering of the vehicle-occupant protection system.

DE 10 2010 045 581 A1 discloses a method for programming data in a non-volatile memory with a first programming mode, wherein it is possible to switch over to a second programming mode by means of a control device. In this context, the programming in the second programming mode has a shorter programming time and a shorter data holding time compared to the first programming mode.

If a high-voltage control device has disconnected the high-voltage battery owing to a crash signal, the re-activation is not to take place without previous monitoring. It is therefore possible to provide in the high-voltage control device a non-volatile memory which stores this event and then prevents the activation when powering up occurs. However, in the case of a crash it is possible for relatively long voltage dips to occur, with the result that without an auxiliary voltage source it is, under certain circumstances, not possible for the storage process in the high-voltage control device to be concluded. However, the high-voltage control device would then re-activate the high-voltage battery.

The invention claimed is:

1. An airbag control device that generates at least one actuation signal for an actuation time period as a function of at least one sensor signal,
   wherein the airbag control device includes at least one non-volatile memory in which the generated at least one actuation signal is stored,
   wherein, in the event of failure of a voltage supply, the airbag control device maintains the at least one actuation signal for a holding time period,
   wherein, when the at least one actuation signal is generated, a status signal is stored in the at least one non-volatile memory or in a further non-volatile memory, which status signal is deleted if the at least one actuation signal was generated for longer than a storage time period that is longer than the holding time period and less than or equal to the actuation time period, and
   wherein, when the airbag control device is powered up, an actuation signal is generated and transmitted for a second actuation time period if the status signal is still set or if the generation of the at least one actuation signal is stored in the at least one non-volatile memory.

2. The airbag control device of claim 1, wherein the second actuation time period is selected to be equal to the actuation time period.

3. A voltage network in a motor vehicle, the voltage network comprising:
   at least one contactor;
   a high-voltage power system having at least one high-voltage battery disconnectable from the high-voltage power system via at least one contactor; and
   a low-voltage on-board power system with an on-board power system battery;
   an airbag control device; and
   a high-voltage control device that actuates the at least one contactor at least as a function of an actuation signal of the airbag control device,
   wherein the high-voltage control device includes a non-volatile memory that stores an actuation signal of the airbag control device as a stored signal,
   wherein, when powering up occurs, the at least one contactor is closed only if there is no current entry of the stored signal present in the non-volatile memory,
   wherein the airbag control device generates at least one actuation signal for an actuation time period as a function of at least one sensor signal, the airbag control device comprises at least one non-volatile memory in which the generated at least one actuation signal is stored,
   wherein, in the event of failure of a voltage supply, the airbag control device maintains the at least one actuation signal for a holding time period,
   wherein, when the at least one actuation signal is generated, a status signal is stored in the at least one non-volatile memory or in a further non-volatile memory, which status signal is deleted if the at least one actuation signal was generated for longer than a storage time period that is longer than the holding time period and less than or equal to the actuation time period,
   wherein, when the airbag control device is powered up, an actuation signal is transmitted for a second actuation time period if the status signal is still set.

4. The voltage network of claim 3, wherein the airbag control device is embodied with an energy store or with an auxiliary voltage source or the airbag control device is assigned an auxiliary voltage source, by which the voltage supply for the airbag control device is maintained for the holding time period in the event of a voltage dip.

5. A method for actuating a voltage network in a motor vehicle, wherein the voltage network has a high-voltage power system with a high-voltage battery which is disconnectable from the high-voltage power system via at least one contactor, and a low-voltage on-board power system with an on-board power system battery, an airbag control device and a high-voltage control device,
   wherein the high-voltage control device actuates the at least one contactor at least as a function of an actuation signal of the airbag control device,
   wherein the high-voltage control device and the airbag control device are each embodied with at least one non-volatile memory in which the occurrence of an actuation signal of the airbag control device is stored,
   wherein, when the high-voltage control device is powered up the at least one contactor is closed only if there is no current entry of an actuation signal present as a signal in the non-volatile memory of the high-voltage control device, wherein, when a voltage supply is present, the airbag control device makes available the actuation signal for an actuation time period, and when the voltage supply fails, the airbag control device keeps the actuation signal available for at least a holding time period, wherein, when the at least one actuation signal is generated, the airbag control device stores a status signal in the at least one non-volatile memory of the airbag control device or in a further non-volatile memory of the airbag control device, wherein the status signal is deleted if the at least one actuation signal is generated for longer than a storage time period, wherein the storage time period is longer than the holding time period and less than or equal to the actuation time period, wherein, when the airbag control device is powered up, an actuation signal is transmitted again for a second actuation time period if the status signal is still set or if the generated at least one actuation signal is stored in the at least one non-volatile memory.

6. The method of claim 5, wherein the second actuation time is selected to have the same length as the actuation time period.

* * * * *